(12) United States Patent
Bender et al.

(10) Patent No.: US 6,368,439 B1
(45) Date of Patent: *Apr. 9, 2002

(54) RETREADED TIRES AND METHOD FOR MAKING THE SAME WITHOUT SPRAY CEMENT

(75) Inventors: David L. Bender, Muscatine; James E. Bundschuh, Jr., Davenport; Lawrence Carlson, Muscatine; Johnathon Leslie Logsden, Tipton; Floyd S. Myers, Muscatine; Gary W. Schnedler, Letts; Ronald Seiler, Muscataine, all of IA (US)

(73) Assignee: Bandag Licensing Corporation, Muscatine, IA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,864

(22) Filed: Dec. 27, 1996

Related U.S. Application Data

(63) Continuation of application No. 08/399,070, filed on Mar. 8, 1995, now abandoned.

(51) Int. Cl.[7] .............................................. B29D 30/56
(52) U.S. Cl. ........................ 156/96; 156/128.1; 156/130; 156/130.3
(58) Field of Search ........................ 156/96, 127, 128.1, 156/128.6, 129, 130, 130.3; 152/209 R

(56) References Cited

U.S. PATENT DOCUMENTS

| | | | |
|---|---|---|---|
| 2,675,855 A | * 4/1954 | Heintz | 156/96 |
| 3,698,975 A | * 10/1972 | Hogan, Jr. | 156/96 |
| 3,728,181 A | * 4/1973 | Simmons, Jr. | 156/96 |
| 3,753,821 A | 8/1973 | Ragen | 156/96 |
| 3,951,719 A | 4/1976 | Hough | |
| 3,964,949 A | * 6/1976 | Kent et al. | 156/96 |
| 3,989,563 A | * 11/1976 | Schelkmann | 156/96 |
| 4,096,008 A | * 6/1978 | Taylor | 156/96 |
| 4,371,411 A | * 2/1983 | Honda et al. | 156/96 |
| 4,600,467 A | * 7/1986 | Perdue | 156/96 |
| 5,277,727 A | * 1/1994 | Seiler et al. | 152/209 R |
| 5,306,130 A | 4/1994 | King et al. | |
| 5,342,462 A | 8/1994 | King et al. | |
| 5,342,473 A | * 8/1994 | Bibona et al. | 156/96 |
| 5,354,406 A | 10/1994 | King et al. | |
| 5,503,904 A | 4/1996 | Majumdar et al. | |

FOREIGN PATENT DOCUMENTS

| | | |
|---|---|---|
| CA | 2120473 | 10/1994 |
| EP | 0 104 812 | 4/1984 |
| EP | 0 253 793 | 1/1988 |
| EP | 0 528 683 | 2/1993 |
| EP | 730 950 A2 | 9/1996 |
| WO | 96/27493 | 9/1996 |

* cited by examiner

*Primary Examiner*—Geoffrey L. Knable
(74) *Attorney, Agent, or Firm*—Leydig, Voit & Mayer Ltd.

(57) ABSTRACT

A retreaded tire assembly and method for making the same is disclosed. The method and assembly provide for the application of new tread to a buffed tire casing with only a layer of cushion gum disposed therebetween. The cushion gum is applied directly to the buffed circumference of a tire casing without the use of conventional spray cement normally applied to the buffed surface of the entire casing.

23 Claims, 5 Drawing Sheets

RETREADED TIRES AND METHOD FOR MAKING THE SAME WITHOUT SPRAY CEMENT

This is a Continuation of application Ser. No. 08/399,070 filed Mar. 8, 1995 abandoned.

TECHNICAL FIELD

This invention relates generally to a method for making retreaded tires and particularly to a method for making retreaded tires that eliminates the need for spray cement normally applied to the tire casing.

BACKGROUND OF THE INVENTION

Retreaded tires have been available for many years and provide an economical way to gain additional use out of a tire casing after the original tread has become worn. According to one conventional method of retreading, sometimes referred to as cold process retreading, the remaining tread on the used tire is removed by a special buffing machine that grinds away the old tread and leaves a buffed surface to which a new layer of tread may be bonded.

Removal of the old tread from the tire casing provides a generally smooth treadless surface about the circumference of the tire casing. The tire casing may then be examined for injuries, often called skives, which are filled with a repair gum. After completion of the skiving process, the buffed surface is sprayed with a tire cement that provides a tacky surface for application of bonding material and new tread. Then a layer of cushion gum is applied to the back, i.e., the inside surface, of a new layer of tread. The cushion gum and tread are applied in combination about the circumference of the tire casing to create a retreaded tire assembly ready for curing. The cushion gum forms the bonds between the tread and the tire casing during curing.

Following assembly of the tire casing, cement, cushion gum and tread, the overall retreaded tire assembly is placed within a flexible rubber envelope. An airtight seal is created between the envelope and the bead of the tire. The entire enveloped tire assembly is placed within a curing chamber, and subjected to pressure and a raised temperature for a specific period of time. The combination of pressure, temperature and time chemically bonds the layer of cushion gum to both the tire casing and the new tire tread.

The above-described method of cold process retreading works well and provides high quality, retreaded tires. However, in certain applications it would be advantageous to eliminate the spray cement. This is particularly true in geographical areas where there is increased regulation of the use of chemicals within spray cement. Generally, available spray cements include either heptane solvent or methyl chloroform. The heptane solvent has been found to contribute to smog formation, and methyl chloroform, although it does not cause smog, has tended to be substantially more expensive then heptane solvent.

Use of spray cement can also add to the cost of producing retreaded tires due to the product cost and equipment cost. For example, because cementing of the tire casing should only be dome in a well ventilated spray booth, retreading shops must purchase appropriate ventilation equipment. Elimination of the spray cement thus eliminates the need to purchase ventilated spray booths.

A potential solution to smog problems associated with using heptane solvent is the installation of solvent capture equipment at each retreading shop. However, this solution is disadvantageous due to the cost of the equipment and the operational and maintenance costs. The present invention addresses the drawbacks associated with using spray cement during retreading of tires.

SUMMARY OF THE INVENTION

The present invention includes a method for retreading a tire that comprises the steps of removing the tire tread from a tire casing to present a buffed surface. Then, a layer of cushion gum is applied directly to the buffed surface without spraying cement over the buffed surface. A tread layer is wrapped about the layer of cushion gum, and finally, the tire is treated to form bonds between the casing and the layer of cushion gum and between the tread layer and the layer of cushion gum.

Another unique aspect of the invention is a retreaded tire assembly prepared for insertion into a pressurized heating chamber. The tire assembly includes a tire casing having a pair of side walls and a radially outer wall spanning the pair of side walls. The radially outer wall has a buffed surface disposed about the outer circumference of the tire casing. A layer of cushion gum is disposed directly against the buffed surface, and a tread layer is disposed against the cushion gum about the outside circumference of the cushion gum. After appropriate heat and pressure treatment, the tire casing, cushion gum and tread layer became bonded into an integral retreaded tire that may be used on an appropriate over-the-road vehicle.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
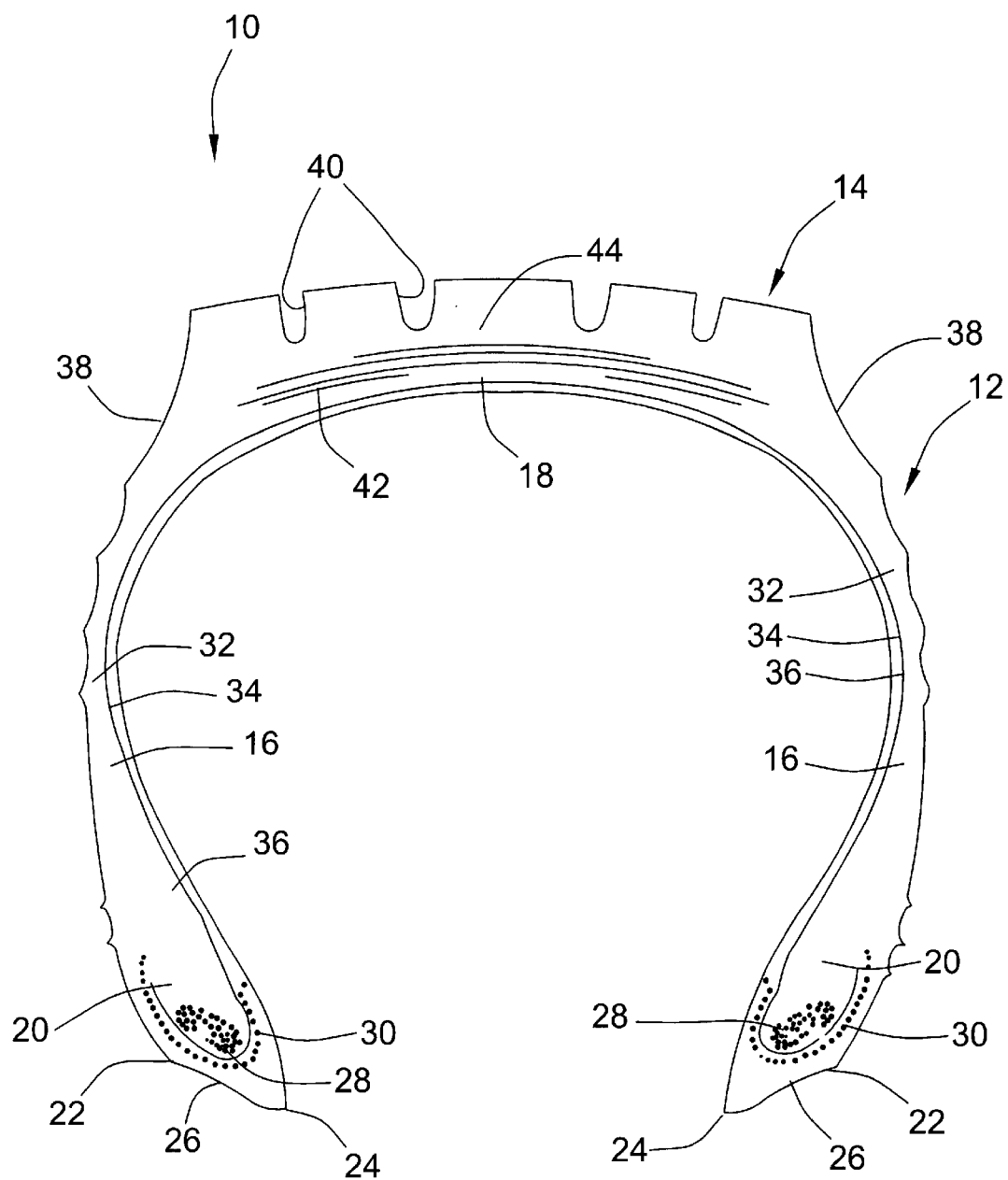
FIG. 1 is a cross-sectional view of an exemplary original tire.

Referring generally to FIG. 1, an original tire 10 is shown as having a tire casing 12 from which extends a tire tread 14. The illustrated tire 10 is a radial tire; however, the invention applies equally to other types of tires, such as bias ply tires.

More particularly, tire 10 includes a pair of side walls 16 bounded by a generally radially outward wall 18 that spans side walls 16. Each side wall 16 extends radially inward from outer wall 18 and terminates in a bead area 20 designed for mounting on the tire rim (not shown). Bead area 20 may be designed in a variety of configurations depending on, for example, tire type, tire size or rim configuration. In the illustrated embodiment, each bead area 20 includes a bead heel 22, a bead toe 24, and a bead sole 26. Each bead area 20 may also include a bead bundle 28 and a chafer ply 30. Both bead bundle 28 and chafer ply 30 may include, for example, metal strands or wires to improve the strength of bead area 20.

Side walls 16 may also include multiple layers, such as a rubber layer 32, a radial ply 34 and an inner liner 36 which cooperate to provide a strong but flexible side wall. Side walls 16 are joined to radially outward wall 18 and tread 14 through a pair of shoulder areas 38. Shoulder areas 38 extend towards tire tread 14 which, in turn, is disposed radially outwardly from wall 18 of tire casing 12. Tire tread 14 may include a plurality of grooves 40 designed to channel water and provide added traction during certain road conditions. Additionally, outer wall 18 may be strengthened by a plurality of belts or cords 42 extending circumferentially about tire 10 within wall 18 (see FIGS. 2 and 5).

Figure 2:
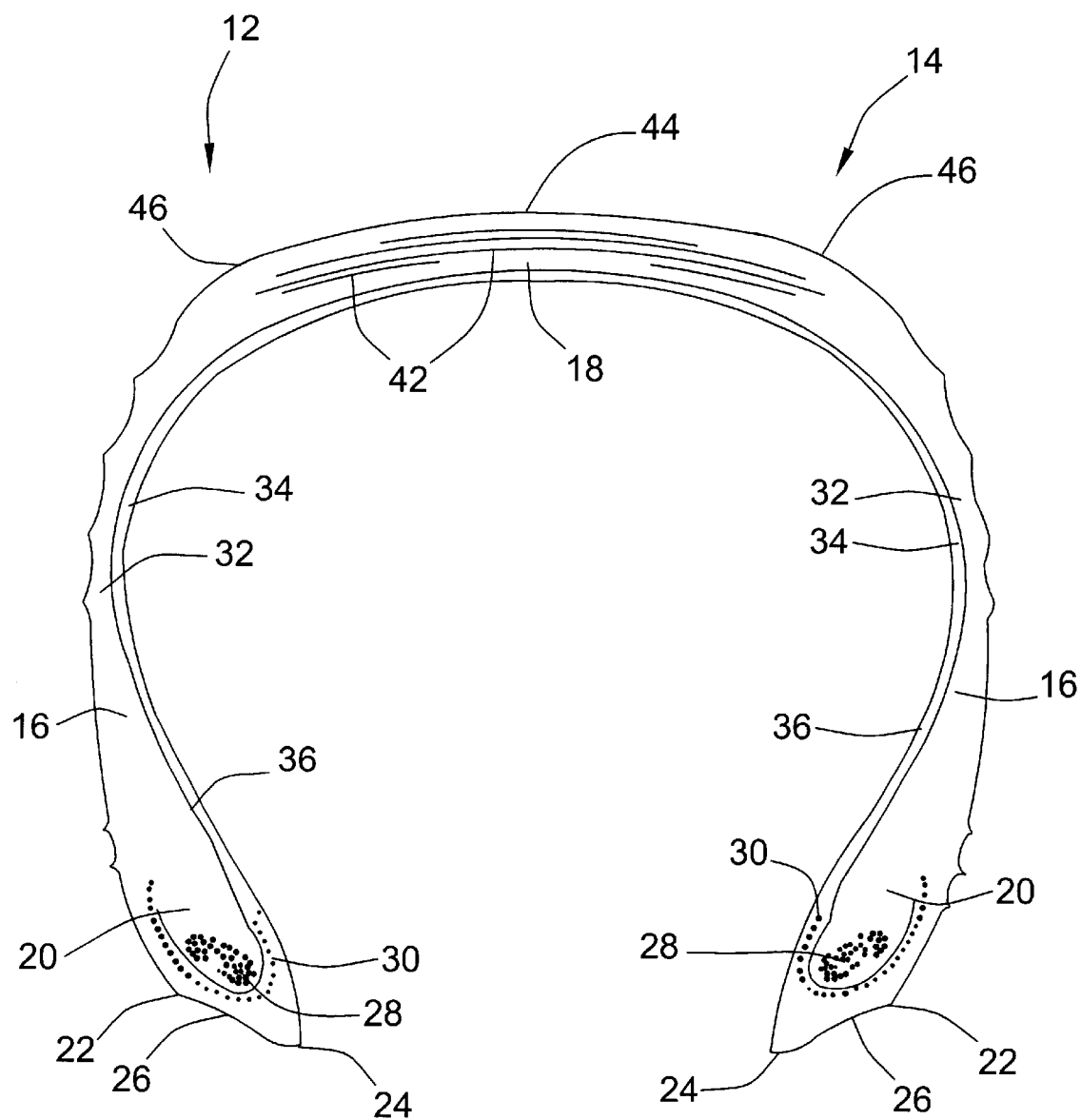
FIG. 2 is a cross-sectional view of the tire of FIG. 1 after the tread layer has been removed from the tire casing.

After tire tread 14 wears beyond a certain limit, tire 10 must either be discarded or retreaded before it should be used on the vehicle for which it was designed. In cold process retreading, the remaining tire tread 14 is removed from tire casing 12 by a buffing machine, such as the Model 8110 buffing machine manufactured by Bandag, Incorporated of Muscatine, Iowa. During the buffing operation, the original tire tread 14 is ground away from tire casing 12, leaving a buffed surface 44 as illustrated in FIG. 2. Buffed surface 44 extends circumferentially about tire casing 12 and also extends transversely across the outside of outer radial wall 18 until it terminates at buffed shoulder areas 46.

Following removal of the used tread layer, a process called skiving and filling is performed on tire casing 12. Skiving is the removal of damaged material from a tire prior to making a repair. Often, the tire casing 12 accumulates holes, nicks or tears due to stones or other sharp objects the tire comes in contact with during use. The injured or damaged area is first ground smooth by an appropriate grinding tool and then filled with repair gum, such as Bandag extruder repair rope or repair gum or some other suitable material. It is necessary to fill the injured areas to the level of buffed surface 44 to avoid air pockets between buffed surface 44 and the later applied tread layer. Trapped air can have negative effects on the longevity of a typical retreaded tire. Following the skiving and filling operation, a building step occurs in which a layer of cushion gum and a new tread layer are wrapped about the circumference of tire casing 12 along buffed surface 44.

Figure 3:
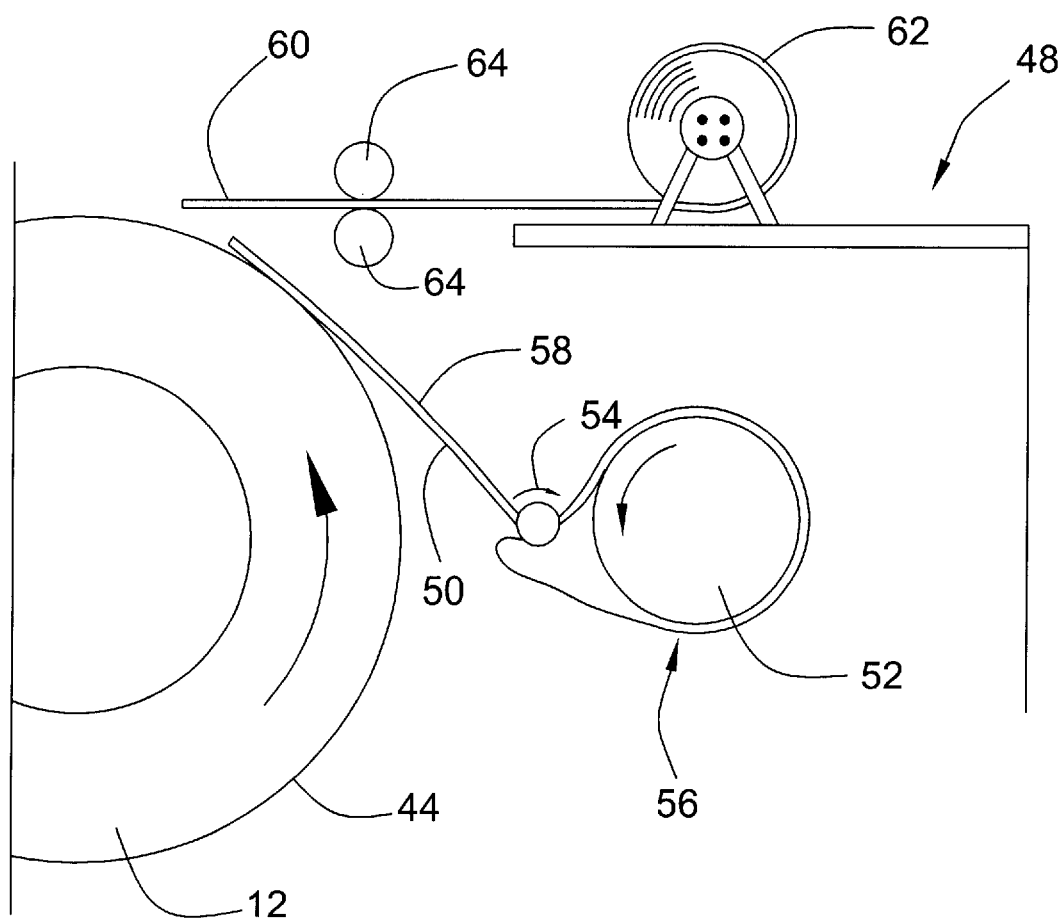
FIG. 3 is a schematic representation of the layer of cushion gum and the mew tread layer being applied to a tire casing.

As illustrated best in FIG. 3, a building machine 48 (shown schematically), such as the Bandag 5110 semiautomatic builder manufactured by Bandag, Incorporated, may be used to apply a layer of cushion gum 50, such a HD30 cushion gum manufactured by Bandag, Incorporated. Although the layer of cushion gum 50 could be applied to tire casing 12 in a variety of ways, the schematic representation of FIG. 3 shows a roll of the cushion gum 52 rotatably mounted on building machine 48. The layer of cushion gum 50 moves about a tensioning roller 54 prior to being wrapped circumferentially around buffed surface 44.

Preferably, cushion gum layer 50 is covered by a bottom plastic sheet 56, e.g. a poly sheet, and a similar top plastic sheet 58. As illustrated, bottom sheet 56 is peeled away from cushion gum layer 50 shortly before the cushion gum is wrapped about tire casing 12 along buffed surface 44. Bottom plastic sheet 56 may then be wrapped about tensioning roller 54 as shown in FIG. 3.

Cushion gum layer 50 is preferably applied to buffed surface 44 within eight hours of buffing. Additionally, the application has been found to work best when the layer of cushion gum 50 is applied under tension in the circumferential direction. Depending on the application, it may be desirable to slightly stretch the cushion gum layer 50 to achieve better adherence to buffed surface 44. Cushion gum layer 50 is cut transversely and the cut edge is spliced with the leading edge so there is no gap between the beginning and the end of cushion gum layer 50. Any overlap between the leading edge and the trailing cut edge is preferably limited to one-eighth inch or less.

After cushion gum layer 50 is applied to tire casing 12, layer 50 is stitched, or in other words pressed, against buffed surface 44 to drive out any air trapped between the cushion layer and buffed surface 44. Following stitching, the top layer of plastic 58 is removed from cushion gum layer 50 to permit a new tread layer 60 to be applied over the cushion gum. The stitching step also helps prevent the cushion from lifting away from buffed surface 44 when plastic layer 58 is removed and tread layer 60 is applied.

Preferably, tread layer 60 is also applied with the assistance of building machine 48, although there are a variety of ways to wrap tread layer 60 about the circumference of tire casing 12. When using building machine 48, a tread roll 62 is rotatably mounted thereon, and tread layer 60 is guided onto tire casing 12 against cushion gum layer 50 by guide rollers 64.

Tire casing 12 is rotated on building machine 48 until a sufficient length of tread layer 60 is unraveled from tread roll 62 to extend about the circumference of tire casing 12. Tread layer 60 is then cut generally transversely to the circumferential direction, and the cut end is butted up against the leading edge of tread layer 60 to form a splice. The tread layer splice is often held together by a plurality of staples (not shown). It is also preferred that the spliced area of cushion gum layer 50 and the spliced area of tread layer 60 be disposed at different points along buffed surface 44.

Although the application of cushion gum layer 50 and tread layer 60 to a tire casing 12 by building machine 48 has been generally known in the industry for many years, the unique aspects of this invention method of retreading allows the omission of a previous step, namely the application of spray cement to buffed surface 44. Previously, spray cement would be initially applied to buffed surface 44. Then, cushion gum layer 50 would be applied to the inside or lower surface of tread layer 60. The combination of cushion gum layer 50 and tread layer 60 would be wrapped about cement covered buffed surface 44 and spliced together.

The present method permits the elimination of the spray cement which overcomes certain disadvantages described in the background of the invention section above. By first stretching the layer of cushion gum about the circumference of tire casing 12, stitching the cushion gum and then applying tread layer 60 over the combined tire casing 12 and cushion gum layer 50, the necessity of using spray cement has been eliminated. It has been found that retreaded tires made according to the new method have very desirable characteristics without requiring an extra cementing step.

Figure 4:
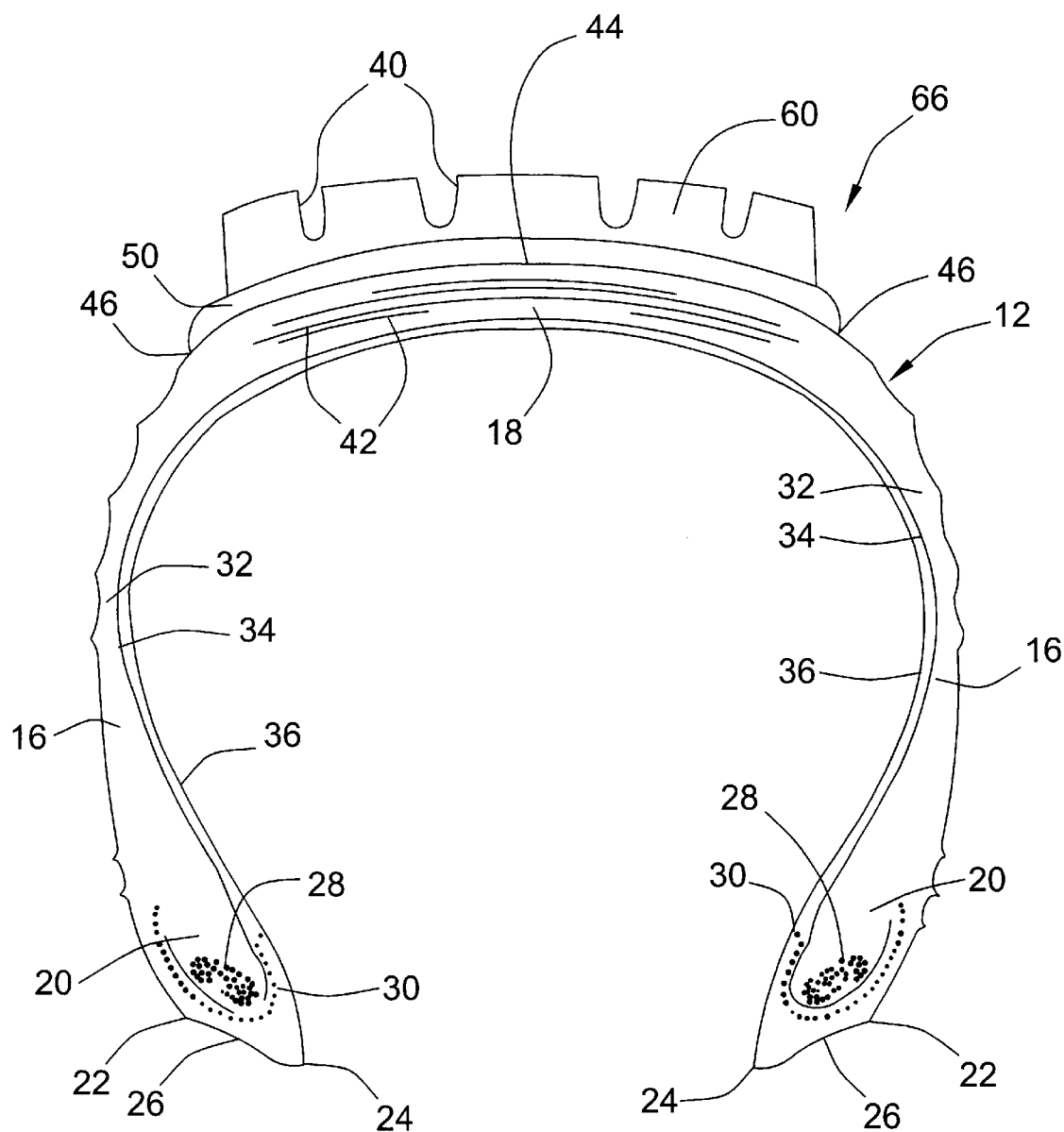
FIG. 4 is a cross-sectional view of the tire casing illustrated in FIG. 2 with the addition of the layer of cushion gum and the new tread layer.

After application of cushion gum layer 50 and tread layer 60, a retreaded tire assembly 66 is created and ready for curing under appropriate heat and pressure conditions. A cross section of the retreaded tire assembly 66 is illustrated best in FIG. 4. After assembly, the overall tire assembly is inserted into a rubberized curing envelop, such as the appropriate Bandag, Incorporated curing envelope designed for the particular tire type and size being retreaded.

The retreaded tire assembly 66 is sealed within the curing envelope and placing within a curing chamber, such as the Model 4130 or 4120 curing chamber sold by Bandag, Incorporated. Pressure and heat are applied to the retreaded tire assembly 66 within the curing chamber. The amount of time necessary to cure a given retreaded tire may vary depending on the size of the tire and the materials used. However, the time must be long enough to create sufficient bonding between the tire casing 12 and cushion gum layer 50 and between the tread layer 60 and cushion gum layer 50. Generally, the bonding results from vulcanization between the tire casing, cushion gum layer and tread layer. The times, pressures and temperatures within the curing chamber would be known by one of ordinary skill in the art. However, exemplary parameters during curing within the curing chamber are temperature: approximately 210° F.; pressure: approximately 85 psi; and time: approximately three and one-half hours. The above listed temperature, pressure and time parameters are only provided as examples, and are not meant to limit the scope of the invention. As stated previously, the time within the curing chamber may vary depending on the tire size and tire materials. Additionally, other combinations of temperature and pressure can potentially provide satisfactory results. After curing, the retreaded tire may undergo certain minor trimming operations, but otherwise is ready for use on a vehicle.

Figure 5:
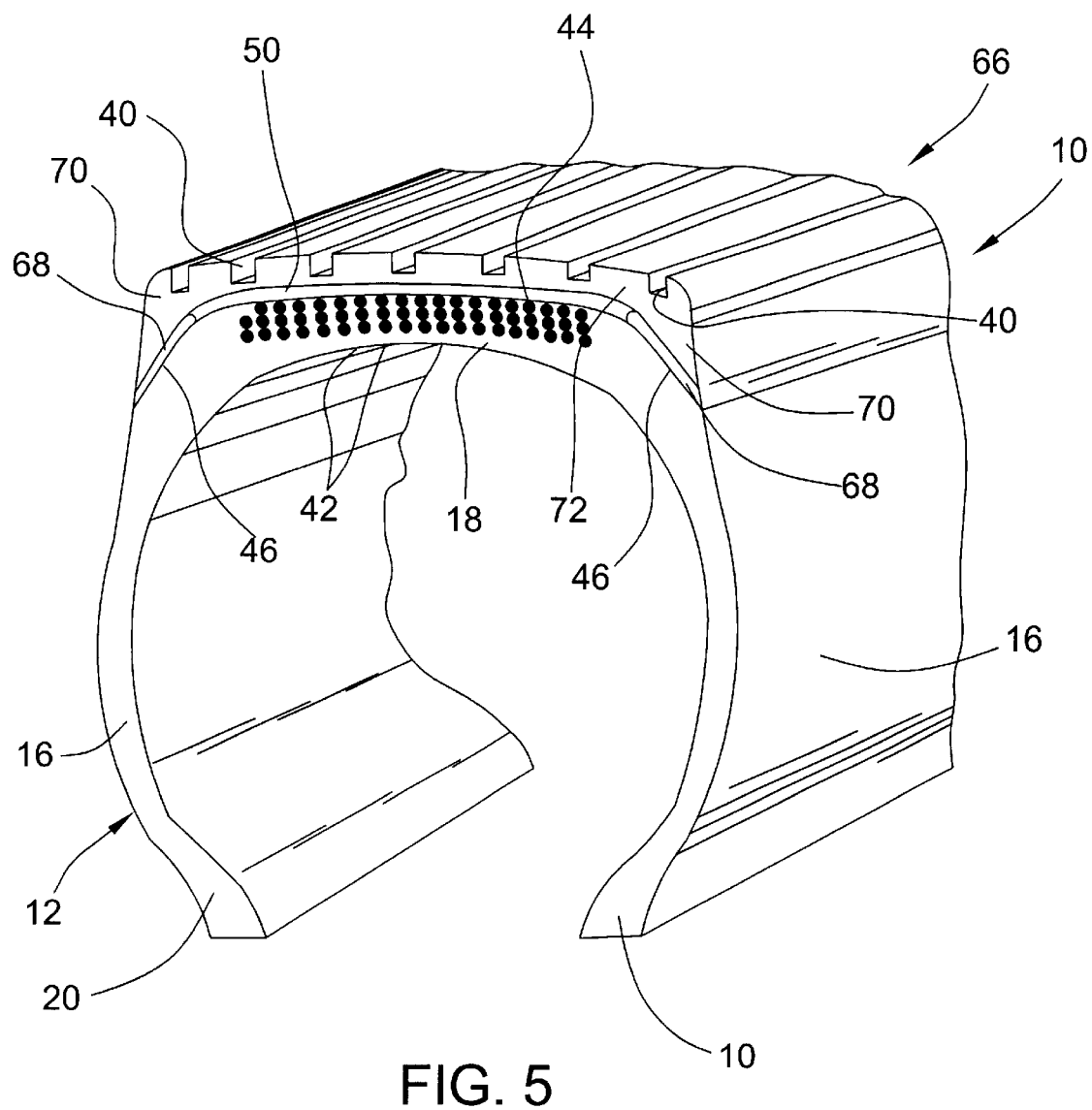
FIG. 5 is a perspective cross-sectional view of an alternate embodiment of a retreaded tire according to the invention.

Another embodiment of retreaded tire assembly 66 is illustrated in FIG. 5. The process used for this type of retreaded tire is the same as that described above, except for the addition of a pair of shoulder strips 68 of cushion gum that are added to accommodate arched outer flanges 70 of a slightly different tread layer 72. In this embodiment, tread layer 72 extends about the circumference of tire casing 12 as described above, but the arched outer flanges 70 curve in the transverse direction generally about shoulder areas 46 of tire casing 12. Accordingly, additional cushion gum must be added in the form of shoulder strips that run generally along each shoulder area 46 of tire casing 12 and beneath flanges 70.

Thus, after cushion gum layer 50 is applied to buffed surface 44, and stitched thereto, the top layer of plastic 58 is removed and shoulder strips 68 are applied along shoulder areas 46. The tread layer 72 including its arched outer flanges 70 is applied over cushion gum layer 50 and shoulder strips 68, measured, cut, and spliced similarly to that described above.

The various parameters involves in cementless retreading of tires may vary depending on the overall design of the tire being retreaded and the composition of the retreading materials. However, in general, it is preferred that the temperature of both tire casing 12 and cushion gum layer 50 be at least 65 degrees Fahrenheit when the cushion gum layer is applied to buffed surface 44. Additionally, the cushion should be applied to the uncemented casing within eight hours of buffing or, if the buffed casing is covered with poly, the cushion application should be within 72 hours of buffing. Furthermore, to ensure a high quality retreaded tire, it is preferred that the centerline of cushion layer 50 be aligned with the center line of the buffed casing within plus or minus one-eighth inch. When applying the flat style tread illustrated in FIG. 4, there should be at least one-eighth inch of cushion layer 50 extending transversely past the base of the tread on each side of tread layer 60. Similarly, cushion layer 50 should be applied with enough tension to facilitate conformation to the buffed surface 44, but the tension should not cause the width of cushion layer 50 to be reduced by more than one-eighth inch. Generally, the length of cushion layer 50 is approximately 2–8 inches shorter than the circumference of buffed surface 44.

It will be understood that the foregoing description is of the preferred exemplary embodiment of this invention and that the invention is not limited to the specific form shown. For example, the invention is directed to a tire assembly and a method for retreading tires that does not require the use of spray cement, and therefore a wide variety of equipment may be used to apply the layers of cushion gum and tread to the tire casing. Additionally, the invention encompasses a broad variety of tires, materials, and tread designs that may be assembled according to the invention. The methods of preparing the tire casing and curing the retreaded tire assembly may vary substantially due to differences in materials, equipment and techniques for creating retreaded tires. These and other modifications may be made in the design and arrangement of the elements without departing from the scope of the invention as expressed in the appended claims.

What is claimed is:

1. A method for retreading a tire comprising:
    removing tire tread from a tire casing to present a buffed tire casing having a buffed surface;
    applying a layer of unheated cushion gum directly to the buffed surface within a predetermined time period, wherein the layer of unheated cushion gum comprises a top plastic sheet and the cushion gum is applied under tension to stretch the layer of cushion gum circumferentially so as to facilitate conformation to the buffed surface and stitching the cushion gum with a pressure to allow removal of the top plastic sheet from the cushion gum without lifting the cushion gum away from the buffed surface;
    removing the top plastic sheet from the cushion gum;
    wrapping a tread layer about the layer of cushion gum;
    inserting the buffed tire casing, the layer of cushion gum and the tread layer into a curing envelope; and
    treating the tire to form bonds between the casing and the layer of cushion gum and between the tread layer and the layer of cushion gum.

2. The method for retreading a tire as recited in claim 1 wherein the layer of cushion gum is applied against the buffed surface with sufficient pressure to force air from between the casing and the layer of cushion gum.

3. The method for retreading a tire as recited in claim 2 wherein applying the layer of cushion gum further comprises cutting the layer of cushion gum generally transverse to the circumferential direction and splicing the layer of cushion gum at the cut region.

4. The method for retreading a tire as recited in claim 3 wherein wrapping the tread layer further comprises cutting the tread layer generally transverse to the circumferential direction and splicing the tread layer at the cut region.

5. The method for retreading a tire as recited in claim 4 wherein treating the tire comprises heating the tire, the cushion gum and the tread layer, and further comprising applying a vacuum within the envelope and applying pressure to the outside of the envelope.

6. The method for retreading a tire as recited in claim 1 wherein applying the layer of cushion gum further comprises applying a pair of shoulder strips to the buffed surface.

7. The method for retreading a tire as recited in claim 1 wherein the cushion gum is applied to the buffed surface at a temperature of at least about sixty-five degrees Fahrenheit.

8. The method for retreading a tire as recited in claim 1 wherein the cushion gum is applied to the to the buffed surface within about 72 hours of buffing.

9. The method for retreading a tire as recited in claim 1 wherein the cushion gum is applied to the to the buffed surface within about 8 hours of buffing.

10. The method for retreading a tire as recited in claim 1 wherein the treating step comprises heating to a temperature of about 210 degrees Fahrenheit and applying a pressure of about 85 psi for about 3 and one-half hours.

11. The method for retreading a tire as recited in claim 1 wherein the cushion gum further comprises a bottom plastic sheet which is removed from the cushion gum before applying the cushion gum to the buffed tire casing.

12. A method for retreading a tire comprising:
   removing old tread from a tire casing to present a buffed tire casing having a buffed surface;
   applying an unheated layer of cushion gum comprising a top plastic sheet and a bottom plastic sheet directly to the buffed surface within a predetermined amount of time under tension to stretch the layer of cushion gum circumferentially so as to facilitate conformation to the buffed surface and stitching with a pressure effective to adhere the unheated cushion gum to the buffed surface and to allow removal of the top plastic sheet from the cushion gum without lifting the cushion gum away from the buffed surface, wherein the bottom plastic sheet is removed from the cushion gum prior to contacting the cushion gum with the buffed surface;
   removing the top plastic sheet from the cushion gum without lifting the cushion gum away from the buffed surface;
   wrapping a tread layer about the layer of cushion gum;
   inserting the buffed tire casing, the layer of cushion gum and the tread layer into a curing envelope; and
   then uniformly heating the combined buffed tire casing, the tread layer and the layer of cushion gum to form a vulcanized bond therebetween.

13. The method for retreading a tire as recited in claim 12 wherein removing old tire tread comprises grinding the tire tread from the tire casing.

14. The method for retreading a tire as recited in claim 12, further comprising removing contaminants from the buffed surface prior to applying the cushion gum.

15. The method for retreading a tire as recited in claim 12 wherein the heating step further comprises placing the combined tire casing, the tread layer and the layer of cushion gum within a pressure chamber.

16. The method for retreading a tire as recited in claim 15 wherein the heating step further comprises creating a vacuum within the curing envelope.

17. The method for retreading a tire as recited in claim 16 wherein the heating step comprises heating the combined buffed tire casing while the combined buffed tire casing, the tread layer and the layer of cushion gum are in the pressure chamber.

18. The method for retreading a tire as recited in claim 12 wherein the cushion gum is applied to the buffed surface at a temperature of at least about sixty-five degrees Fahrenheit.

19. A process for manufacturing a retreaded tire comprising: providing a tire with a worn tread, buffing off the existing tread of the tire to prepare a tire casing with a buffed surface; applying a layer of unheated cushion gum comprising a top protective layer directly to the buffed surface within about 72 hours after the buffed surface is created by said buffing, wherein the cushion gum is applied under tension to stretch the layer of unheated cushion gum as it is applied to facilitate conformation to the buffed surface; stitching the cushion gum with a pressure effective to allow removal of the top protective layer from the cushion gum without lifting the cushion gum away from the buffed surface; removing the top protective layer; placing a tire tread upon the exterior of the cushion gum; encasing the tire tread, layer of unheated cushion gum, and buffed casing in an envelope; and treating the tire to form bonds between the casing and the layer of cushion gum and between the tread layer and the layer of cushion gum.

20. The method of claim 19 wherein the cushion gum is applied to the buffed surface within about 8 hours of buffing.

21. A process for manufacturing a retreaded tire comprising:
   providing a tire with a worn tread;
   buffing off the existing tread of the tire to prepare a tire casing with a buffed surface;
   applying a layer of unheated cushion gum directly to the buffed surface under tension to stretch the layer of unheated cushion gum to facilitate conformation to the buffed surface and thereafter stitching the layer of unheated cushion gum with sufficient pressure to force air from between the casing and the layer of cushion gum;
   placing a tire tread upon the exterior of the cushion gum;
   encasing the tire tread, layer of unheated cushion gum, and buffed casing in an envelope; and
   treating the tire to form bonds between the casing and the layer of cushion gum and between the tread layer and the layer of cushion gum.

22. The method of claim 21 wherein the cushion gum is applied to the buffed surface within about 72 hours of buffing.

23. The method of claim 21 wherein the cushion gum is applied to the buffed surface within about 8 hours of buffing.

* * * * *